(12) United States Patent
Boyd et al.

(10) Patent No.: US 6,669,915 B1
(45) Date of Patent: Dec. 30, 2003

(54) GAS-LIQUID INLET NOZZLE FOR COCURRENT DOWNFLOW REACTORS

(75) Inventors: Sherri L. Boyd, Robbinsville, NJ (US); Gregory P. Muldowney, Glen Mills, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/351,806

(22) Filed: Jul. 13, 1999

(51) Int. Cl.[7] ............... B01F 3/00; B01F 3/08; B01F 5/00
(52) U.S. Cl. ............ 422/224; 422/139; 422/140; 422/143; 422/144; 261/1; 261/19
(58) Field of Search .................. 422/139, 140, 422/143, 144, 145, 147, 211, 224; 261/1, 19

(56) References Cited

U.S. PATENT DOCUMENTS

| | | | | |
|---|---|---|---|---|
| 3,598,541 A | * | 8/1971 | Hennemuth et al. | 422/191 |
| 4,118,337 A | * | 10/1978 | Gross et al. | 252/417 |
| 4,834,343 A | * | 5/1989 | Boyes | 261/79.2 |
| 5,002,671 A | * | 3/1991 | de Villiers et al. | 210/740 |
| 5,152,967 A | | 10/1992 | Rossetti et al. | 422/194 |
| 5,462,719 A | | 10/1995 | Pedersen et al. | 422/195 |
| 5,554,346 A | * | 9/1996 | Perry et al. | 422/195 |
| 5,935,413 A | * | 8/1999 | Boyd et al. | 208/49 |
| 6,123,830 A | * | 9/2000 | Gupta et al. | 208/76 |

* cited by examiner

Primary Examiner—Jerry D. Johnson
Assistant Examiner—Alexa A Doroshenk
(74) Attorney, Agent, or Firm—Malcolm D. Keen

(57) ABSTRACT

A fluid inlet nozzle distributor for a downflow fixed bed reactor which is a cylindrical housing having inlet and outlet openings and a swirl chamber disposed within said housing, whereby said swirl chamber imparts rotational motion to a fluid exiting said inlet nozzle.

5 Claims, 3 Drawing Sheets

GAS-LIQUID INLET NOZZLE FOR COCURRENT DOWNFLOW REACTORS

FIELD OF THE INVENTION

The present invention relates to an inlet distribution apparatus for process gases and liquids in a cocurrent downflow reactor.

BACKGROUND OF THE INVENTION

In hydroprocessing, reforming and various chemical production reactors within a petroleum refinery or the like, fixed bed reactors featuring cocurrent downflow of gas or gas-liquid mixtures through beds of solid catalyst require efficient fluid distribution at the inlet of the reactor. Optimal reactor performance and control may be achieved only when the fluids are uniformly distributed across the entire catalyst bed area, so that all of the catalyst is contacted by the flowing reactant fluids.

Reactor flow distribution begins in the inlet nozzle where fluids are dispersed over the downstream trays or catalyst beds. These reactors are typically fed by a single inlet line approaching horizontally and connecting to a 90° elbow directed downward into the reactor vessel. The elbow, attached to the vessel's top flange, leads to an expanded cylindrical manway mounted on the hemispherical or elliptical reactor head. Directly below the vessel entrance is the inlet nozzle distributor.

An effective inlet nozzle distributor should accomplish at least four objectives. First, the distributor should erase all angular and radial asymmetries imparted by the approach piping, thereby achieving uniform coverage over the tray or solids bed below. In general, a flow bias will exist towards the outer wall of the inlet elbow, and for gas-liquid mixtures, this may result in phase segregation at the reactor inlet. Second, the hardware should reduce or break the entering fluid momentum to prevent high-velocity erosion of the shell, internals or solids bed. This deceleration is particularly important when the pre-distributor tray does not reach the reactor wall. Liquid contacting at high velocity can splash off this pre-distributor tray to the final distributor tray, thus compromising two-phase distribution. Third, the pressure drop across the inlet nozzle must be acceptable for optimal reactor flow rates. Finally, the distributor design must not permit excessive coking and solids accumulation.

For two-phase processes, poor fluid distribution will negatively impact the completeness and uniformity of catalyst wetting. This flow maldistribution will decrease effective catalyst activity and may lead to lateral temperature differences in the bed, leading to off-spec products, higher temperature requirements, poorer product selectivities and faster catalyst deactivation. In gas-phase reactors, ineffective distribution can create high-velocity eddies in the reactor head, leading to erosion of the solids bed.

U.S. Pat. No. 5,152,967 to Rossetti, et al. discloses the use of a vaned swirl chamber in a fixed-bed reactor quench zone located between two catalytic beds.

U.S. Pat. No. 5,462,719 to Pedersen, et al. discloses a method and apparatus for mixing two reactants within a column such as a process stream of both gas and liquid phases, and a quench gas. The apparatus is located beneath the lower end of an upper catalyst bed in a column (col. 3, lines 21–23).

SUMMARY OF THE INVENTION

A first object of the present invention is to provide an apparatus for imparting an overall rotational direction of flow to fluids entering a fixed bed reactor, so as to reduce or eliminate flow asymmetries and break fluid momentum entering the reactor.

A second object of the present invention is to provide such an apparatus which is easily retrofitted into existing fixed bed reactors, so as to minimize capital expenditures, while providing improved fluid flow within the reactors, so as to enhance the overall efficiency of the fixed bed reactor.

One embodiment of the present invention is directed to a fluid inlet nozzle for a downflow reactor which is a cylindrical housing having inlet and outlet openings and a swirl chamber disposed within said housing, whereby said swirl chamber imparts rotational motion to a fluid exiting said inlet nozzle.

BRIEF DESCRIPTION OF THE DRAWINGS

The above and other objects, features and advantages of the present invention will be better understood from the following detailed descriptions, taken in conjunction with the accompanying drawings, all of which are given by illustration only, and are not limitative of the present invention.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention relates to a fluid inlet nozzle distributor for a downflow reactor which is a cylindrical housing having inlet and outlet openings and a swirl chamber disposed within said housing, whereby said swirl chamber imparts rotational motion to a fluid exiting said inlet nozzle. The inlet nozzle distributor of the present invention reduces or eliminates flow asymmetries imparted by the approach piping to the reactor and breaks fluid momentum, with a relatively low pressure drop within the system.

In one embodiment, the swirl chamber is formed of a plurality of swirl vanes mounted axially and substantially concentrically within said cylindrical housing, at substantially a same non-tangential angle relative to a wall of the cylindrical housing.

In a second embodiment, the swirl chamber is formed of a spiral tray mounted axially within said cylindrical housing.

In a third embodiment, the swirl chamber is formed of a cyclone mounted within said cylindrical housing with a plurality of duct entrances.

In a fourth embodiment, the swirl chamber is formed of a cyclone mounted within said cylindrical housing with one duct entrance.

The fluid inlet nozzle swirl chamber may have a splash plate mounted within the cylindrical housing between said inlet opening and the swirl-imparting means. Preferably, the splash plate is mounted upon the swirl vanes of the first embodiment.

Figure 1:
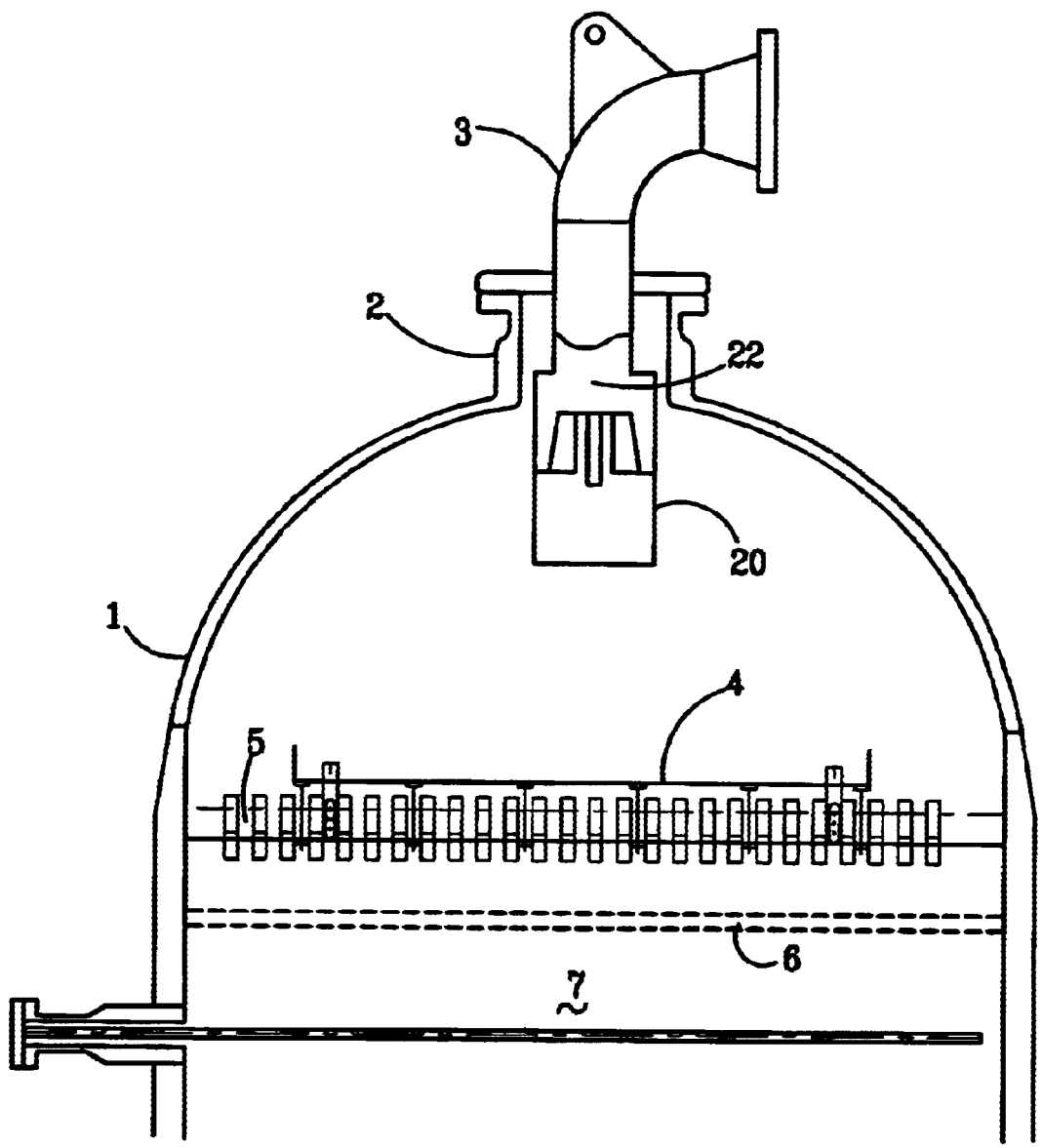
FIG. 1 is a cut-away side view of a cocurrent downflow reactor incorporating the fluid inlet nozzle of the present invention.
Figure 2:
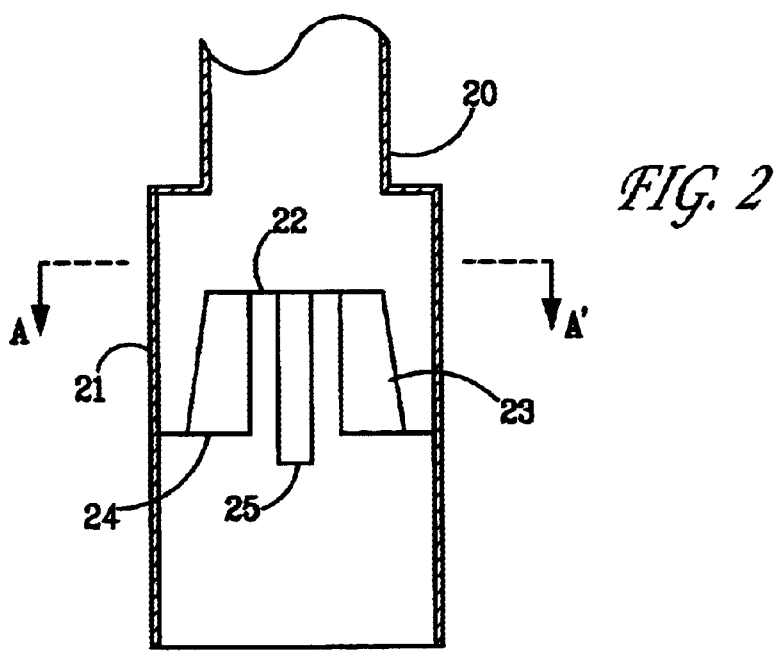
FIG. 2 is a cut-away side view of the fluid inlet nozzle of the present invention.

FIG. 1 is a cut-away side view of a cocurrent downflow reactor 1 incorporating the fluid inlet nozzle 20 of the present invention. The fluid inlet nozzle 20 is housed in a cylindrical vessel (FIG. 2) of larger diameter than the inlet piping and is mounted below a 90° elbow 3, which feeds the reactant stream into reactor 1, through a cylindrical manway 2. The reactor has various internal structures above catalyst bed 7, including a pre-distributor tray 4, and distribution tray 5 with downcomers and a relatively thin bed of inert materials 6, to prevent disruption of the underlying catalyst.

Figure 3:
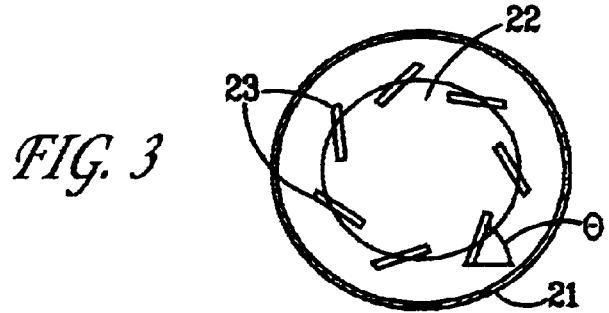
FIG. 3 is a cut-away section at line A, A' of FIG. 2 of the fluid inlet nozzle of the present invention.

Reactant fluids, which may be a liquid, a gas or mixtures thereof, flow vertically into the reactor 1, contact a horizontal circular disk or splash plate 22 of a smaller diameter than the nozzle housing 21, causing a change in flow direction radially toward the walls of the housing 21, and then downward into the reactor vessel. Rotational flow in the fluids is induced by forcing the flow through vanes or ducts 23 (FIG. 2), mounted to the nozzle housing with supports 24, and directed non-tangentially toward the interior of the nozzle housing at an angle θ (FIG. 3) less than 60° from the tangent direction. The swirl vanes 23 can be mounted substantially concentrically as shown in FIG. 3 within the cylindrical housing at an acute angle to a line parallel to the tangent of the cylindrical housing at a point on a straight line containing i) the center of the housing, ii) the end of said vane which is closer to a wall of the cylindrical housing, and iii) the wall itself. All of the swirl vanes can be mounted at substantially the same relative acute angle, θ, which can be greater than 0° and less than 90°, preferably no greater than 60°, for example 30° to 60°, say about 45°.

Figure 4:
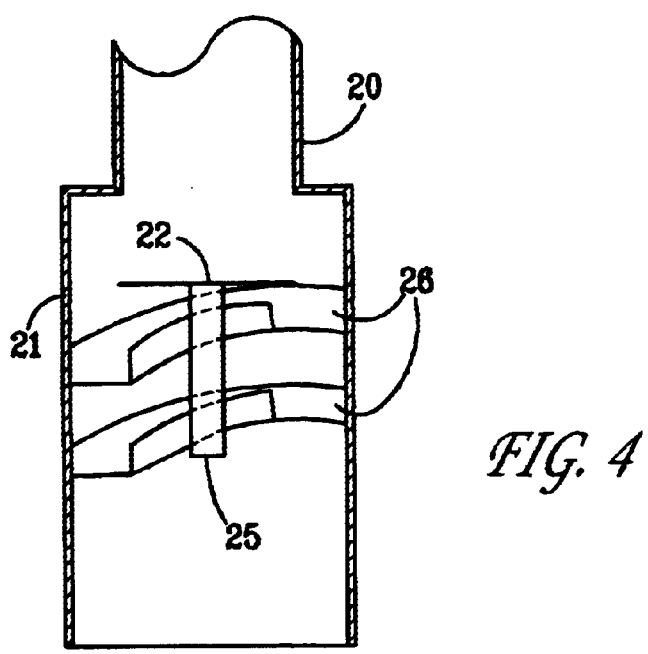
FIG. 4 is a cut-away side view of a second embodiment of the fluid inlet nozzle of the present invention incorporating a spiraling tray.

Alternatively, rotational flow in the fluids can be induced by forcing the flow through fluid inlet nozzle 20 through a swirl chamber comprising a spiral tray 26 mounted axially within the cylindrical housing 21 as shown in FIG. 4.

The supports 24 may form a restriction that concentrates the rotational flow. The swirling fluids are thus uniformly dispersed over the tray 5 or solids bed 7 downstream of the nozzle at a velocity significantly lower than that at the reactor inlet.

The fluid flow entering between the vanes is substantially horizontal which optimally results in a maximum number of rotations in the swirl volume. The entrances formed between the vanes or ducts 23 are typically rectangular openings rather than narrow slots, e.g., the ratio of the height of the opening to the width of the opening is preferably less than 10, which openings may extend minimally into the swirl volume or may have significant approach length to the swirl volume, e.g., as much as one swirl chamber diameter, e.g., as much as one swirl chamber diameter. The entrances may take the form of evenly spaced baffles or as few as one to two ducts. The swirl chamber can contain an obstruction 25 substantially centered in the swirl chamber so as to occupy the center of rotational motion, to concentrate the rotational flow. The swirling fluids are thus uniformly dispersed over the tray 5 or solids bed 7 downstream of the nozzle at a velocity significantly lower than that at the reactor inlet.

Fluids can flow out of the swirl volume into an extension of the cylindrical housing, although this extension is optional depending on the desired angle of fluid dispersion. Thus, the cylindrical housing can extend below the outlet opening in the swirl chamber to confine fluid exiting the swirl chamber to a conic volume projecting downward below the outlet opening. In a preferred embodiment, the fluid inlet is located above a first distributor tray in the downflow reactor and the conic volume has a horizontal cross-section smaller than the area, e.g., equal to or less than half of the area of the first distributor tray, at the elevation where the fluid exiting said inlet nozzle contacts the first distributor tray.

The swirl chamber of the present invention can be advantageously sized for minimum pressure drop by conventional methods.

The swirl chamber may also be sized to achieve minimum residual flow bias in the fluids exiting the inlet nozzle in the angular coordinate, which is defined as flow uniformity around the perimeter of the outlet opening of the inlet nozzle, and/or in the radial coordinate, which is defined as flow uniformity from the center to the outer radius of the outlet opening of the inlet nozzle. This is especially useful where the fluids are dispersed directly over solids bed 7 or a pre-distributor tray 4 which does not reach the reactor wall.

The swirl chamber may also be sized to achieve minimum velocity in the fluids exiting the outlet opening of the inlet nozzle. This is especially useful where fragile catalyst beds are employed or liquid splashing from a pre-distributor tray 4 is a concern.

For all cases, the swirl chamber can be sized by conventional methods, e.g., by using well-established textbook fluid mechanics for turbulent flows. The foregoing techniques result in the swirling fluids being more uniformly dispersed over the tray 5 or solids bed 7 downstream of the nozzle at a velocity significantly lower than that at the reactor inlet.

Figure 5:
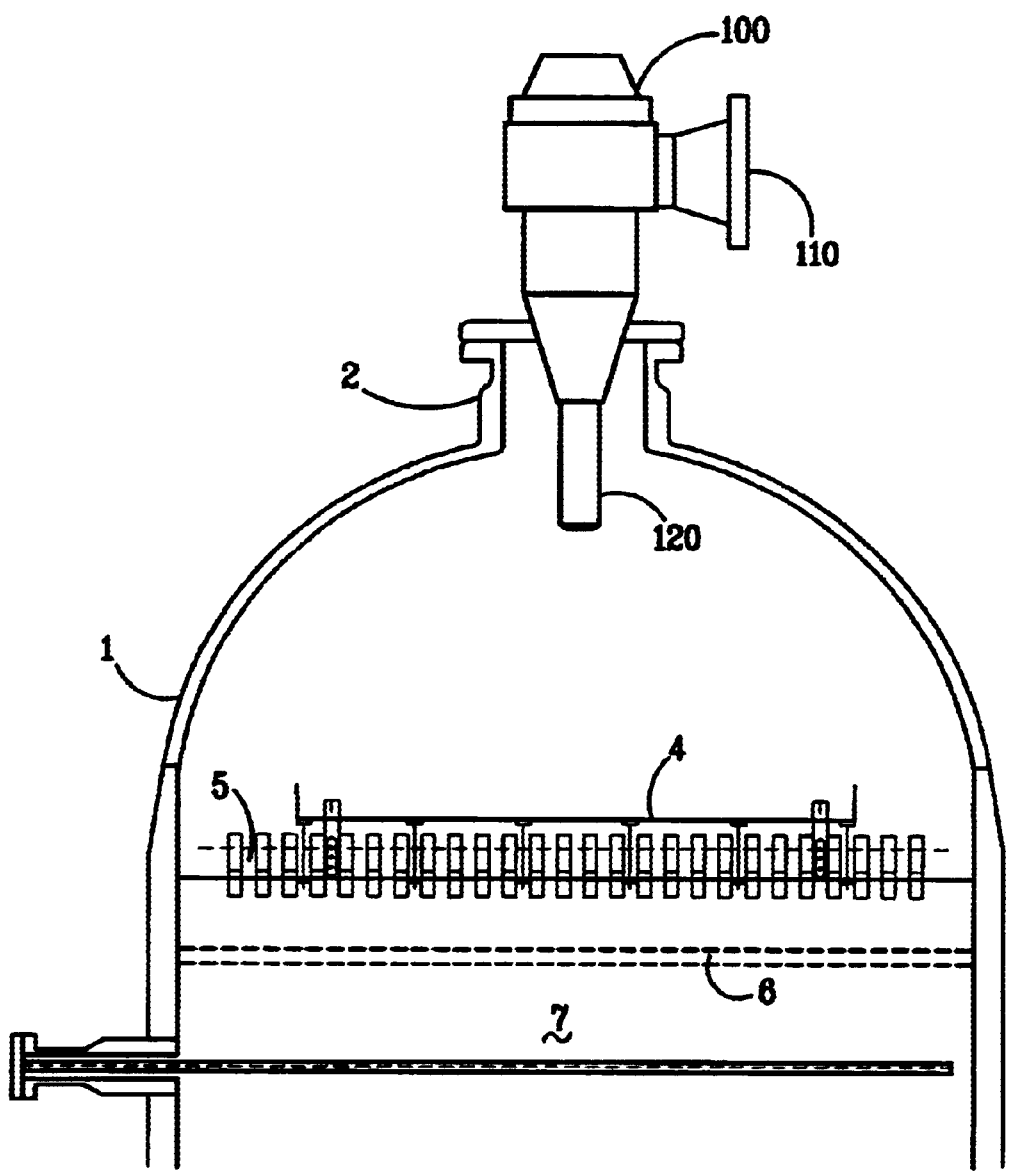
FIG. 5 is a cut-away side view of a third embodiment of the fluid inlet nozzle of the present invention incorporating a cyclone.

FIG. 5 is a cut-away side view of a cocurrent downflow reactor 1 similar to that of FIG. 1 except that the fluid inlet nozzle is cyclone 100. The cyclone 100 has an inlet 110 which feeds the reactant stream into the cyclone where the direction is changed from sideways to downward, exiting through outlet 120 as a cyclone stream downstream of cylindrical manway 2. In one embodiment, the cyclone can have a plurality of duct entrances.

Advantageously, the inventive inlet nozzle distributor design easily retrofits into existing fixed bed reactors and the simplicity of the design minimizes the capital expenditure required to commercialize this technology.

EXAMPLE

A half scale laboratory unit, using air and water to simulate the fluid mechanics of a cocurrent downflow fixed bed reactor, comprising an inlet nozzle distributor having a swirl chamber comprising eight vanes was compared with existing designs having (A) conical diffusers, (B) circular disks, and (C) a slotted cylinder. Flow rates simulated the fluid mechanics of a typical hydrocracker reactor. Symmetry of dispersion, deceleration of fluids, and pressure drop were measured and are reported at the Table below.

TABLE

| Distributor Type | Symmetry of Dispersion Correction of Flow Measured As: Bias | Deceleration of Fluids Liquid Contained on Tray | Pressure Drop |
|---|---|---|---|
| Present Invention | Complete | >95% | Base |
| Conical Diffusers | None | 75–90% | 0.2 × Base |
| Circular Disks | Partial | <75% | Base |
| Slotted Cylinder | Nearly Complete | <75% | 1.5 × Base |

We claim:

1. A downflow reactor having a liquid inlet comprising:

horizontal reactant fluid inlet piping terminating in a 90 degree elbow having a portion of piping which is directed vertically downward and which is connected to, a cylindrical housing mounted below said ninety degree elbow and located above a distributor tray in the downflow reactor, which distributor tray is located above a catalyst bed, the cylindrical housing:
  (i) being of larger diameter than the downwardly directed piping portion
  (ii) having an liquid inlet opening and a downwardly directed liquid outlet opening,
  (iii) having a swirl chamber disposed within said housing comprising a plurality of swirl vanes or swirl ducts to imparts rotational liquid motion to liquid exiting said inlet nozzle thereby minimizing flow asymmetries and breaking fluid momentum in the vertically downward direction,
  (iv) having an obstruction member in the form of a splash plate mounted within the cylindrical housing and on the swirl vanes or swirl ducts, substantially centered in the swirl chamber that occupies the center of the rotational liquid motion, and
  (v) extending below the outlet opening to confine the liquid exiting the swirl chamber to a conic volume projecting downward below the outlet opening.

2. The fluid inlet nozzle according to claim 1, wherein said plurality of swirl vanes are mounted axially within said cylindrical housing.

3. The fluid inlet nozzle according to claim 2, wherein said swirl vanes are mounted substantially concentrically within said cylindrical housing at an acute angle to a line parallel to the tangent of the cylindrical housing at a point on a straight line through the center of the housing, the end of said vane which is closer to a wall of the cylindrical housing, and said wall.

4. The fluid inlet nozzle according to claim 3 wherein said swirl vanes are mounted at substantially the same relative acute angle which is no greater than 60°.

5. The fluid inlet nozzle according to claim 4 wherein said acute angle ranges from 30° to 60°.

* * * * *